Aug. 21, 1923.

A. M. CURTIS 1,465,758

ELECTRICAL WAVE FILTER

Original Filed Oct. 8, 1917

Inventor:
Austen M. Curtis
by
Atty.

Patented Aug. 21, 1923.

1,465,758

UNITED STATES PATENT OFFICE.

AUSTEN M. CURTIS, OF EAST ORANGE, NEW JERSEY, ASSIGNOR TO WESTERN ELECTRIC COMPANY, INCORPORATED, OF NEW YORK, N. Y., A CORPORATION OF NEW YORK.

ELECTRICAL-WAVE FILTER.

Original application filed October 8, 1917, Serial No. 195,371. Patent No. 1,371,228, dated March 15, 1921. Divided and this application filed August 9, 1919. Serial No. 316,359.

*To all whom it may concern:*

Be it known that I, AUSTEN M. CURTIS, a citizen of the United States, residing at East Orange, in the county of Essex, State of New Jersey, have invented certain new and useful Improvements in Electrical-Wave Filters, of which the following is a full, clear, concise, and exact description.

This invention relates to a novel form of wave filter and has particular reference to one which is capable of being used in radio receiving systems for the purpose of reducing the effect of static or atmospheric disturbances produced in the signaling system when the signals are being received.

This application is a division of A. M. Curtis application, Serial No. 195,371, filed October 8, 1917, "Reduction of static interference in radio receiving stations," on which Patent #1,371,228 was granted on March 15, 1921.

Figure 2:
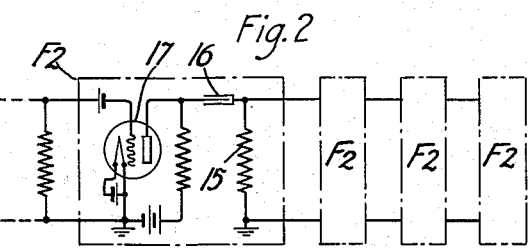

The invention is an improvement on the wave filter shown in Fig. 2 of the application filed by E. O. Scriven, July 14, 1917, Serial No. 180,589, entitled "Oscillation generator." The Scriven application involves the use of a wave filter for efficiently transmitting low frequencies and suppressing high frequencies, and which has been termed an ultra-filter. The present invention takes advantage of the fact that the filter of the above-mentioned Scriven application is substantially free from inductance giving rise to the fact that the natural period of oscillation of the filter is very high in comparison to the frequencies that are efficiently transmitted.

An object of the present invention is to provide a filter of the above-mentioned type with the addition of a uni-directional element such as an audion tube between adjacent filter sections so as to prevent reaction between one section and another.

Another object of the invention is to provide a filter similar to the one just described but of the infra-type, that is, one suppressing relatively low frequencies, this type also having the advantage of a very high natural period by reason of the fact that it is substantially free from inductance. Another object of the invention is to provide a band filter having a very high period of natural oscillation by reason of the fact that it is substantially free from inductance. This type of filter is of particular advantage when used in radio receiving systems, since the energy of the static or similar impulse on striking the filter produces only oscillations of such high frequencies that they do not effect the signal receiving instrument.

The particular form of receiving system into which this filter is adapted to fit is more particularly described in my copending application, Serial No. 195,371, referred to above.

Figure 1:
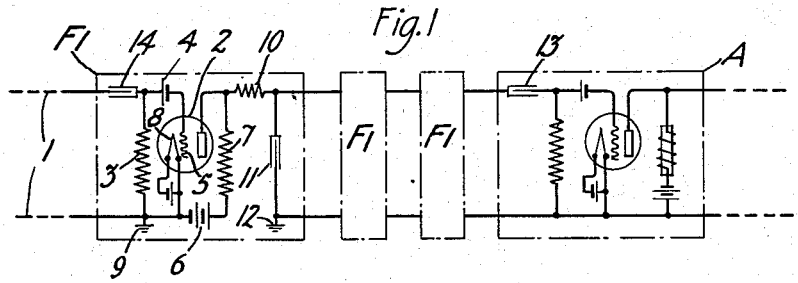
Figure 3:
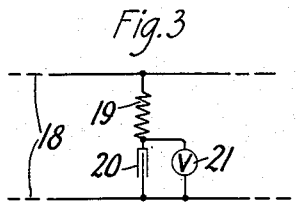
Figure 4:
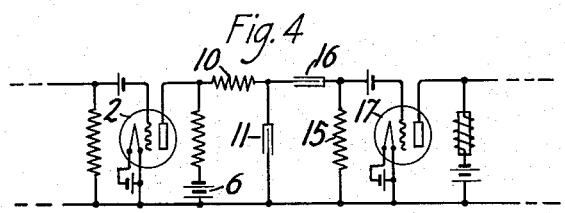

The invention is illustrated in the drawing in which Figs. 1 and 2 illustrate ultra and infra filters respectively, both being substantially free from inductance; Fig. 3 illustrates diagrammatically the filters shown in Figs. 1 and 2 in a simple form; and Fig. 4 illustrates a band filter representing a combination of the filters shown in Figs. 1 and 2.

Referring to Fig. 1, line 1 is adapted to receive currents of varied frequencies, the low frequency components of which are to be selectively transmitted and amplified. the block $F^1$ represents a filter and amplifier section, a plurality of which may be used as represented by the other blocks $F^1$, all of these being connected in tandem. The block $F^1$ comprises a vacuum tube 2 of the audion type having a high resistance 3, in shunt to its input circuit, a battery 4 which assigns a negative potential to the grid 5, and a source 6 which supplies the space current for the tube through the high non-inductive resistance 7. The filament 8 of the tube is grounded as shown at 9. In shunt to the output circuit of the tube 2 is a circuit which includes a high non-inductive resistance 10 and a capacity 11 which is grounded at 12. The next block $F^1$ is connected in shunt to the condenser 11, as shown, and the same is true of all succeeding filter sections. The vacuum tube employed in each of the filter sections is essentially unidirectionally conducting so that a reaction between the filter sections is prevented. The current delivered by the last filter section $F^1$ may be amplified by an ordinary amplifier of the audion type, as shown in block A. In advance of the amplifier in block A, there is provided a condenser 13 which prevents the battery in the output circuit of the preceding tube in the series from assigning a potential to the amplifier A. The condenser 14 in block $F^1$ performs a similar function. The value of these capacities 13 and 14 is very large compared to the other reactances in the system so that their effect on the system is negligible.

In Fig. 2, the filter section $F^2$ is the same as section $F^1$ in Fig. 1, except that the positions of the resistance 10 and the capacity 11 have been interchanged. In Fig. 2, the second filter section $F^2$ is in shunt to the resistance 15, which together with the condenser 16 forms a shunt around the output circuit of the tube 17. In this case also a plurality of filter sections $F^2$ are employed and an amplifier similar to A in Fig. 1 may be used, although this is not shown.

The operation of the filters shown in Figs. 1 and 2 may be elementarily described in connection with Fig. 3 in which the line 18 is adapted to receive currents of various frequencies, only some of which are to be efficiently transmitted. Connected to the line 18 are the resistance 19 and the capacity 20. It will be apparent that currents of very low frequencies find a path of very high impedance through the condenser 20, so that the voltage across the condenser 20 is relatively high, the voltage across resistance 19 being relatively low, since the current is very small. If a voltage responsive device, such as a voltmeter 21 is connected across the condenser 20, it will register a comparatively high voltage for low frequency currents which are received by the line 18. High frequency currents, however, find a path of low impedance through the condenser 20, so that the voltage drop across the condenser 20, as indicated by the voltmeter 21 will be comparatively low, whereas a drop across the resistance 19 will be comparatively high, due to the fact that the current is large. Of the various frequencies which are received by the line 18, the lowest frequency produces the greatest effect upon the voltmeter 21 so that the ultimate effect is to suppress high frequency and therefore this filter is called an ultra-filter. The connection of the voltmeter 21 across the condenser 20 is entirely analogous to the connection of the second filter section $F^1$ of Fig. 1 across the condenser 11. In Fig. 1, however, a plurality of such sections are employed, a uni-directional tube being located between adjacent sections to prevent reaction. Furthermore, the output of the last filter section is connected to an amplifier tube to bring the amplitude of the selected frequency or frequencies up to the desired value.

With regard to Fig. 3 it is apparent that low frequency currents produce a low voltage across the resistance 19, while high frequencies give rise to high voltage. If the next filter section, therefore, is connected across the resistance 19, the low frequencies will be suppressed and the high frequencies accentuated, and this arrangement operates as an infra-filter as is the case with the filters shown in Fig. 2.

In Fig. 4, the filters shown in Figs. 1 and 2 have been combined to provide a filter for transmitting only a band of frequencies, the infra-filter serving to suppress the lower frequencies up to a certain value and the ultra-filter suppressing all frequencies beyond a given value. In this case, the condenser 16 prevents battery 6 from assigning potential to the tube 17. A plurality of such band filters may be used in tandem if desired, each filter having between it and the next a unilateral device such as a vacuum tube, two of which are shown in Fig. 4. The filters shown in Figs. 1, 2 and 4 are substantially free from inductance, and they accordingly have a very high period of natural oscillation.

What is claimed is:

1. A wave filter comprising lumped resistance and comprising only one kind of lumped reactance, a source for supplying electromotive force waves to said filter, and a unidirectional current transmitting device connected between said source and said filter for preventing reaction between said filter and said source.

2. A wave filter comprising a plurality of filter sections, each section comprising lumped resistance and only one kind of reactance, and one of said sections comprising means for preventing said section from reacting on another of said sections, said means comprising an amplifier device.

3. A wave filter comprising a plurality of alternate filter sections and electron discharge sections, said filter sections comprising lumped resistances and comprising means for rendering the natural frequency of oscillation of the sections different from the frequencies of the range to be efficiently transmitted.

4. A wave filter comprising a plurality of filter sections each section comprising resistance and only one kind of reactance, and a unidirectional current transmitting device serially connected between the sections.

5. A wave filter comprising a plurality of filter sections, each section comprising a resistance and only capacitive reactance, and a unidirectional current transmitting device serially connected between the sections.

6. A wave filter for an electric circuit, said filter being free from inductance and comprising a plurality of filter sections, each section comprising a capacity in series with said circuit and a resistance shunted across said circuit.

7. A wave filter for an electric circuit, said filter being free from inductance and comprising a capacity in series in said circuit and a circuit shunted across said first mentioned circuit, said shunt circuit comprising a resistance.

8. A wave filter for suppressing bands of frequencies comprising in association with a line a series resistance and a shunt capacity followed by a series capacity and shunt resistance.

9. A wave filter for suppressing a band of frequencies comprising a plurality of filter sections, each section comprising resistance and having only one kind of reactance, and an amplifier device between each two adjacent sections.

10. A wave filter for suppressing bands of frequencies comprising a plurality of filter sections, each section having in association with a circuit, a series resistance and a shunt capacity followed by a series capacity and a shunt resistance, and a unidirectional current transmitting device between the sections.

11. A system for selectively transmitting high frequency working current more efficiently than relatively low frequencies, said system comprising recurring sections, each section including capacity and resistance but being substantially free from inductance.

12. The combination of an infra filter and an ultra filter connected in tandem, each of said filters including capacity and resistance but being substantially free from inductance.

13. A transmission system comprising two vacuum tubes of the audion type and a circuit comprising a band filter between said tubes, said band filter having lumped capacity in series in said circuit, and said filter having a natural period of oscillation which is outside of the frequencies which it efficiently transmits.

14. A transmission system comprising two vacuum tubes of the audion type and a sectional wave filter between said tubes, one of said sections comprising series resistance and shunt capacity reactance and another of said sections comprising series capacity reactance and shunt resistance.

15. The combination of two vacuum tubes of the audion type and a connecting line therebetween, said line comprising series resistance and series condenser elements and also shunt resistance and shunt capacity elements, a source of energy for the first tube in the series, one of said condensers preventing current from said source from being supplied to a subsequent tube in the series.

16. A wave filter for an electric circuit, said filter comprising two circuits and only one kind of reactance, one of said two circuits comprising resistance and being connected in parallel with said first mentioned circuit, and the other of said two circuits comprising a capacity connected in series with the circuit constituted by said one circuit and said first mentioned circuit in parallel.

17. A filter comprising a plurality of sections, each section comprising lumped series impedance and lumped shunt impedance but only one kind of reactance, and each section serving to pass a range of frequencies and to substantially attenuate another range of frequencies, and a unidirectional current transmitting device serially connected between one section and the succeeding section.

In witness whereof, I hereunto subscribe my name this 6th day of August, A. D. 1919.

AUSTEN M. CURTIS.